(12) United States Patent
Tan et al.

(10) Patent No.: US 8,665,479 B2
(45) Date of Patent: Mar. 4, 2014

(54) THREE-DIMENSIONAL PRINTING

(75) Inventors: Desney S. Tan, Kirkland, WA (US);
Hrvoje Benko, Seattle, WA (US);
Stephen G. Latta, Seattle, WA (US);
Steven Nabil Bathiche, Kirkland, WA
(US); Kevin Geisner, Mercer Island, WA
(US); Kenneth P. Hinckley, Redmond,
WA (US)

(73) Assignee: Microsoft Corporation, Redmond, WA
(US)

( * ) Notice: Subject to any disclaimer, the term of this
patent is extended or adjusted under 35
U.S.C. 154(b) by 102 days.

(21) Appl. No.: 13/401,227

(22) Filed: Feb. 21, 2012

(65) Prior Publication Data

US 2013/0215454 A1    Aug. 22, 2013

(51) Int. Cl.
*G06F 15/00*    (2006.01)
(52) U.S. Cl.
USPC ............................................. 358/1.15
(58) Field of Classification Search
USPC ............................................. 358/1.15
See application file for complete search history.

(56) References Cited

U.S. PATENT DOCUMENTS

| 7,996,101 | B2 | 8/2011 | Menchik et al. | |
|---|---|---|---|---|
| 2005/0251275 | A1* | 11/2005 | Carlson | 700/98 |
| 2008/0269939 | A1 | 10/2008 | Kritchman | |
| 2009/0303507 | A1 | 12/2009 | Abeloe | |
| 2010/0208016 | A1* | 8/2010 | Menchik et al. | 347/86 |
| 2011/0205583 | A1 | 8/2011 | Young et al. | |
| 2011/0222081 | A1 | 9/2011 | Yi et al. | |
| 2011/0282482 | A1 | 11/2011 | Knighton | |

FOREIGN PATENT DOCUMENTS

EP    1898326 A1    3/2008

OTHER PUBLICATIONS

"3D Printing", Retrieved at <<http://www.explainingthefuture.com/3dprinting.html>>,Retrieved Date: Nov. 1, 2011, pp. 4.
Weinberg, Michael, "3D Printing, Intellectual Property, and the Fight over the Next Great Disruptive Technology", Retrieved at <<http://www.publicknowledge.org/files/docs/3DPrintingPaperPublicKnowledge.pdf>>, Nov. 2010, pp. 16.
"Wrench 3D Printing Viral Video", Retrieved at <<http://www.hoax-slayer.com/3D-printer-video.shtml>>, Retrieved Date: Nov. 1, 2011, pp. 5.
Hanlon, Mike, "New Printer Produces 3D Objects on Demand", Retrieved at <<http://www.gizmag.com/go/2578/>>, Retrieved Date: Nov. 1, 2011, pp. 3.
"International Search Report", Mailed Date: Jun. 2, 2013, Application No. PCT/US2013/025480, Filed Date: Feb. 11, 2013, pp. 9.

* cited by examiner

*Primary Examiner* — Saeid Ebrahimi Dehkordy
(74) *Attorney, Agent, or Firm* — William Hwang; Micky Minhas; Wolfe-SBMC (57) ABSTRACT

Three-dimensional printing techniques are described. In one or more implementations, a system includes a three-dimensional printer and a computing device. The three-dimensional printer has a three-dimensional printing mechanism that is configured to form a physical object in three dimensions. The computing device is communicatively coupled to the three-dimensional printer and includes a three-dimensional printing module implemented at least partially in hardware to cause the three-dimensional printer to form the physical object in three dimensions as having functionality configured to communicate with a computing device.

19 Claims, 6 Drawing Sheets

THREE-DIMENSIONAL PRINTING

BACKGROUND

Economies of scale are leveraged, conventionally, to lower the cost of producing goods. To do so may involve a significant capital outlay in equipment, facilities, and so on to produce the goods. Additionally, this may also involve locating those facilities at a significant distance from a potential consumer. Thus, use of these conventional techniques to leverage economies of scale may also result in inefficiencies, such as in the distribution of those goods to potential consumers, production of unused or unwanted goods, and so on.

SUMMARY

Three-dimensional printing techniques are described. In one or more implementations, a system includes a three-dimensional printer and a computing device. The three-dimensional printer has a three-dimensional printing mechanism that is configured to form a physical object in three dimensions. The computing device is communicatively coupled to the three-dimensional printer and includes a three-dimensional printing module implemented at least partially in hardware to cause the three-dimensional printer to form the physical object in three dimensions as having functionality configured to communicate with a computing device.

In one or more implementations, a plurality of objects are caused to be printed in three-dimensions by a computing device, each of the objects representative of a respective item of data accessible to the one or more computing devices. A physical arrangement of the plurality of objects is monitored by the computing device. A logical relationship is formed between the items of data that is based on the monitored physical arrangement of the plurality of objects, respectively, by the computing device.

In one or more implementations, one or more computer-readable storage media comprise instruction stored thereon that, responsive to execution by a computing device, causes the computing device to perform operations. The operations include output of a user interface having representations of functionality that is selectable for inclusion in an object to be formed by a three-dimensional printer, the representations not including indications of components that are to be included as part of the object to provide the functionality. The operations also include computing an arrangement of the corresponding components as part of the object to provide the functionality responsive to selection of a plurality of the representations of functionality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Economies of scale may be leveraged to reduce cost of producing goods. However, use of these techniques may involve inefficiencies of their own, such as distribution of the goods, production of goods that go unwanted, and so forth.

Three-dimensional printing techniques are described. In one or more implementations, a three-dimensional printer is leveraged to form objects that may be leveraged for use with a computing device. The three-dimensional printer, for instance, may be configured to form a substrate, e.g., out of a plastic or resin material. The printer may also be configured to set and interconnect components in the substrate to provide desired functionality. Examples of such components include display components (e.g., LEDs), processing components, sensor components, and so on. In this way, the three-dimensional printer may be used to form objects as desired.

Further, in one or more additional implementations these objects may be used to extend a user's experience in interacting with a computing device. The objects, for instance, may be configured to represent items of data that are accessible to the computing device, such as documents, appointments, a to-do list, workflow, and so on. Physical arrangement of the items may then be used to define a logical arrangement of the represented items of data, such as to group the items, order the items, and so on. Further discussion of these features may be found in relation to FIG. 3.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
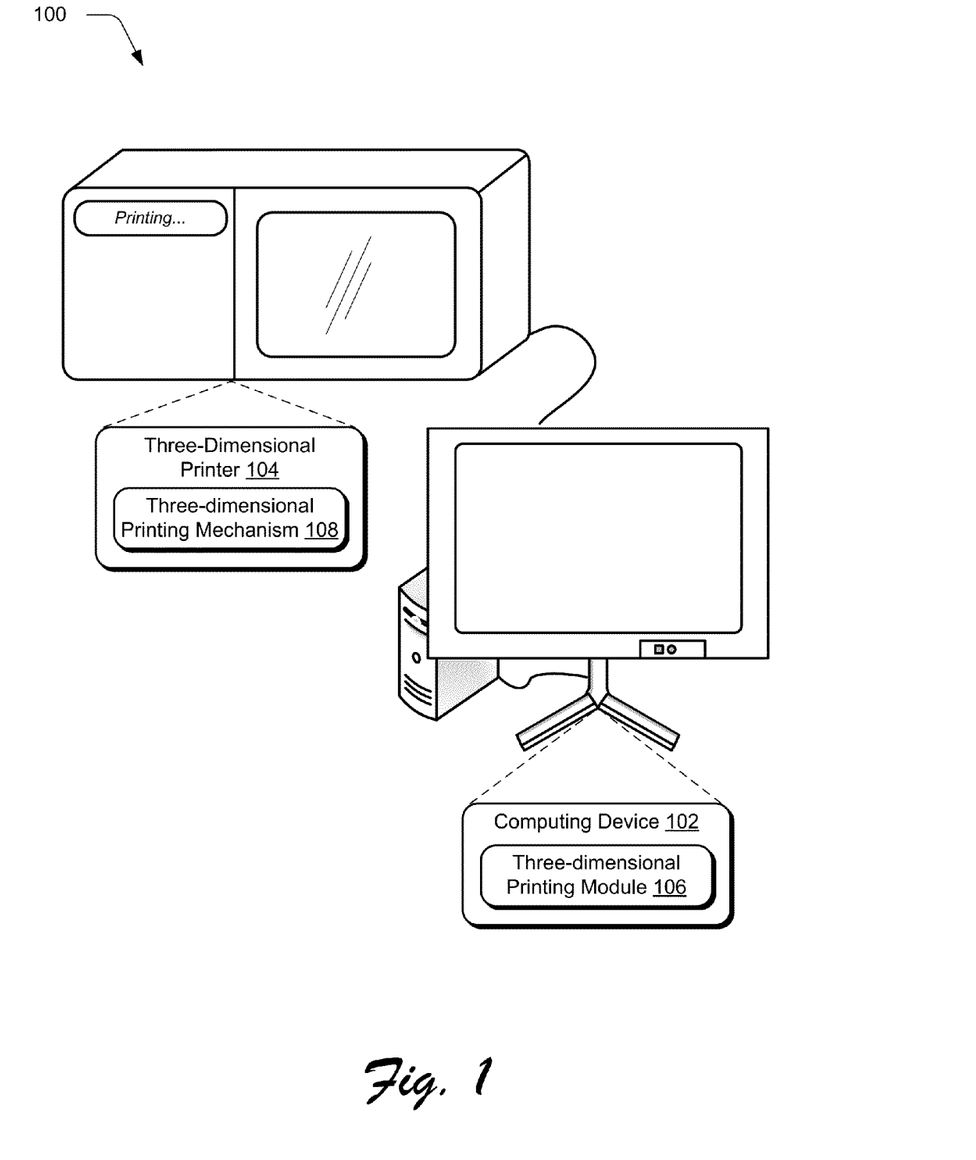
FIG. 1 is an illustration of an environment in an example implementation that is operable to perform three-dimensional printing of an object.

FIG. 1 is an illustration of an environment 100 in an example implementation that is operable to employ techniques described herein. The illustrated environment 100 includes a computing device 102 that is communicatively coupled to a three-dimensional printer 104. Although the computing device 102 is illustrated as a desktop computer, the computing device 102 may be configured in a variety of ways, such as through a plurality of servers, distributed "via the cloud," handheld computing devices, and so on. Thus, the computing device 102 may be communicatively coupled to the three-dimensional printer 104 in a variety of ways, including local or remote (e.g., Internet) connections. Further, although illustrated separately the three-dimensional printer 104 may incorporate the functionality described for the computing device 102, e.g., to function as a stand-alone device.

The computing device 102 is further illustrated as including a three-dimensional printing module 106. This module is representative of functionality to specify an object to be printed by the three-dimensional printer 104. The three-dimensional printing module 106, for instance, may include functionality to model an object to be formed.

The three-dimensional printing module 106 may also be configured to output a user interface, which may be used to support a variety of different user interactions. For example, a user may specify criteria to be used to form the object by the three-dimensional printer 104, which may include a size, shape, and/or color of the object. In another example, a user may select from a variety of predefined objects, which may be customizable by the user, such as to a particular size of an item to be worn by the user.

In a further example, the user interface may provide representations of functionality to be included in the object. The user interface, for instance, may include representations of functionality but not describe how that functionality is to be implemented, e.g., components that are used to implement the functionality and/or how those components are interconnected. A user, for instance, may select an option to include health sensing functionality are part of the object, such as a bracelet to be worn by the user that is usable to detect the user's heartbeat. If that option is selected, the three-dimension printing module 106 may determine which components are to be used to implement that functionality as well as how those components are interconnected as part of the three-dimensional object. Thus, in this instance a user may select functionality to be included in the object without "figuring out" how that functionality is to be implemented.

The three-dimensional printer 104 is illustrated as including a three-dimensional printing mechanism 108. The three-dimensional printing mechanism 108 is representative of functionality to form a three-dimensional object, which may be performed in a variety of ways. The three-dimensional printing mechanism 108, for instance, may use techniques to form the object using a plurality of layers of material, such as plastic or resins, using additive manufacturing techniques.

Examples of this include selective laser sintering (SLS) and fused deposition modeling (FDM) which use melting or softening of material to form the layers. Another example involves curing a liquid material, such as to use digital light processing (DLP) in which a liquid polymer is exposed to light from a DLP projector to form the layers. A further example involves use of inkjet printing techniques to create layers from a powder onto which a binder is printed by the three-dimensional printing mechanism 108. A variety of other examples are also contemplated without departing from the spirit and scope thereof to form a substrate of an object. The three-dimensional printing mechanism 108 may also be configured to arrange components in the substrate to provide desired functionality, further discussion of which may be found in relation to FIG. 2.

Generally, functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. Thus, in this case a module and so on may be implemented at least partially in hardware. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
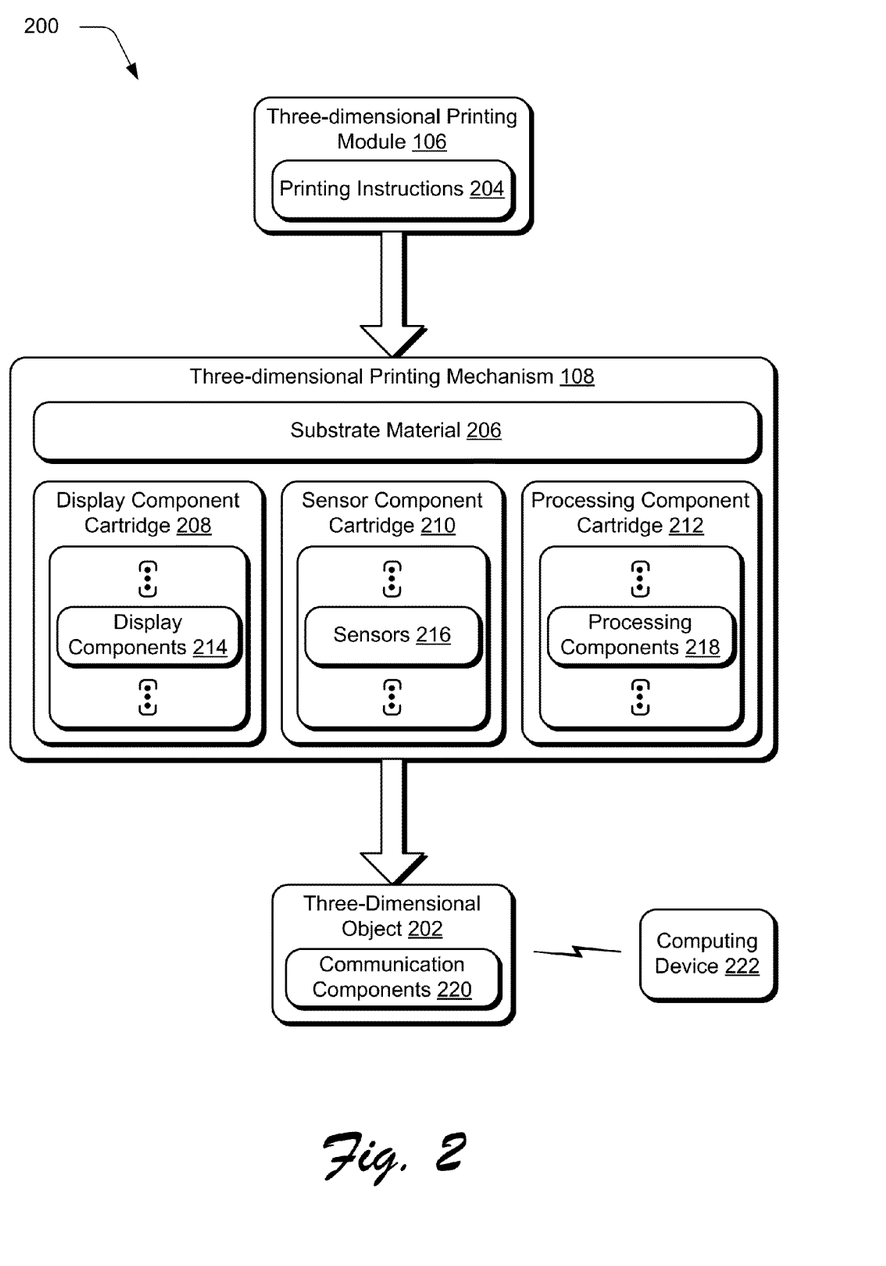
FIG. 2 is an illustration of a system in an example implementation showing a three-dimensional printing module and a three-dimensional printing mechanism of FIG. 1 in greater detail.

FIG. 2 is an illustration of a system 200 in an example implementation showing the three-dimensional printing module 106 and the three-dimensional printing mechanism 108 in greater detail. The three-dimensional printing mechanism 108 in this instance is illustrated as forming a three-dimensional object 202 based on printing instructions 204 received from the three-dimensional printing module 106. As previously stated, the printing instructions 204 may originate in a variety of ways, such as through interaction by a user with a user interface output by the three-dimensional printing module 106.

The three-dimensional printing mechanism 108 may then be used to form the three-dimensional object 202 according to the printing instructions 204. This may include forming a substrate material 206 to have a specified size and shape, which may be performed in a variety of ways as previously described in relation to FIG. 1.

Formation of the three-dimensional object 202 may also include arranging one or more components in the substrate material 206, which may be preconfigured or formed by the three-dimensional printing mechanism 108, itself. Components may be thought of as preconfigured in that such components are not formed by the three-dimensional printing mechanism 108 itself, e.g., printed from the substrate material 206, a conductive ink, and so forth. On the other hand, components may also be formed by the three-dimensional printing mechanism 108 itself, such as to print electrical connections, form antennas and sensors, and so forth.

In the system 200 of FIG. 2, the three-dimensional printing mechanism 108 may include a plurality of cartridges that include different types of components which may be preconfigured and/or configured for formation by the printing mechanism 108 itself. Illustrated examples of these cartridges include a display component cartridge 208, a sensor component cartridge 210, and a processing component cartridge 212 that include display components 214, sensors 216, and processing components 218 respectively. Other examples are also contemplated, such as a communication component cartridge having communication components 220 that are configured to enable the three-dimensional object 202 to communicate with another object, a computing device 222, and so on.

A variety of different display components 214 may be included within the display component cartridge 208, such as light emitting diodes (LEDs), light emitting inks, and so on. Likewise, a variety of different sensors 216 may be included within the sensor component cartridge 210 for use in forming the three-dimensional object 202. Examples of sensors 216 include biometric sensors, such as sensors to detect biometric characteristics of a user of the three-dimensional object 202. Additional examples include sensors 216 that are configured to detect characteristics of the three-dimensional object 202 itself, sensors 216 that are configured to act as an input device (e.g., touch sensitive capacitive sensors that may be printed on the substrate material 206), and so on.

The processing component cartridge 212 may include processing components 218 that are configured to perform one or more operations. Processing components 218 may include integrated circuits, functional blocks, system on a chip (SoC), floating point grid arrays, and so on. Further, the processing components 218 may include one or more computer-readable storage media that may be programmed with instructions to cause the processing components 218 to perform the operations.

In one or more implementations, the printing instructions 204 may include instructions that are to be programmed on the processing components 218 to configure the processing components to perform desired operations. As described previously, in an example a user may select functionality to be included as part of the three-dimensional object 202. In response, the processing components 218 may be programmed to support that functionality, such as to interact with one or more other components, e.g., process signals from the sensors 216. Thus, the processing components 218 may be configured as part of a general purpose token that may be configured for specific operations by the three-dimensional printing mechanism 108 as part of the formation of the three-dimensional object 202. Thus, the general purpose token may be used to support a variety of functionality for implementation by a variety of different devices formed by the three-dimensional printer 104.

Accordingly, the three-dimensional object 202 may be configured in a variety of different ways to provide a variety of different functionality. This may include functionality for medical uses (e.g., identification, medical sensors), mechanical uses, made to be wearable by a user, work as an output device, and so forth.

For example, the three-dimensional object 202 may be configured to expand interactions involved in a user experience between a user and a computing device 222. As illustrated, the three-dimensional object 202 may include communication components 220 that support communication with a computing device 222. The communication components 220 may be leveraged to support a variety of functionality, e.g., the three-dimensional object 202 may include one or more sensors and communicate signals obtained from those sensors for processing by the computing device 222.

The three-dimensional object 202 may also be configured as a physical representation of an item of data that is accessible by the computing device 222, such as an item of data stored on the computing device 222, available via a network connection, and so on. The three-dimensional object 202, for instance, may be configured as electronic paper such that a single "page" may be utilized to view a plurality of pages. Accordingly, a user may make changes using the object and cause those changes to be communicated back to computing device 222. A variety of other examples are also contemplated, such as to define a logical relationship between items of data based on a physical relationship of objects, an example of which is described in relation to the following figure.

Figure 3:
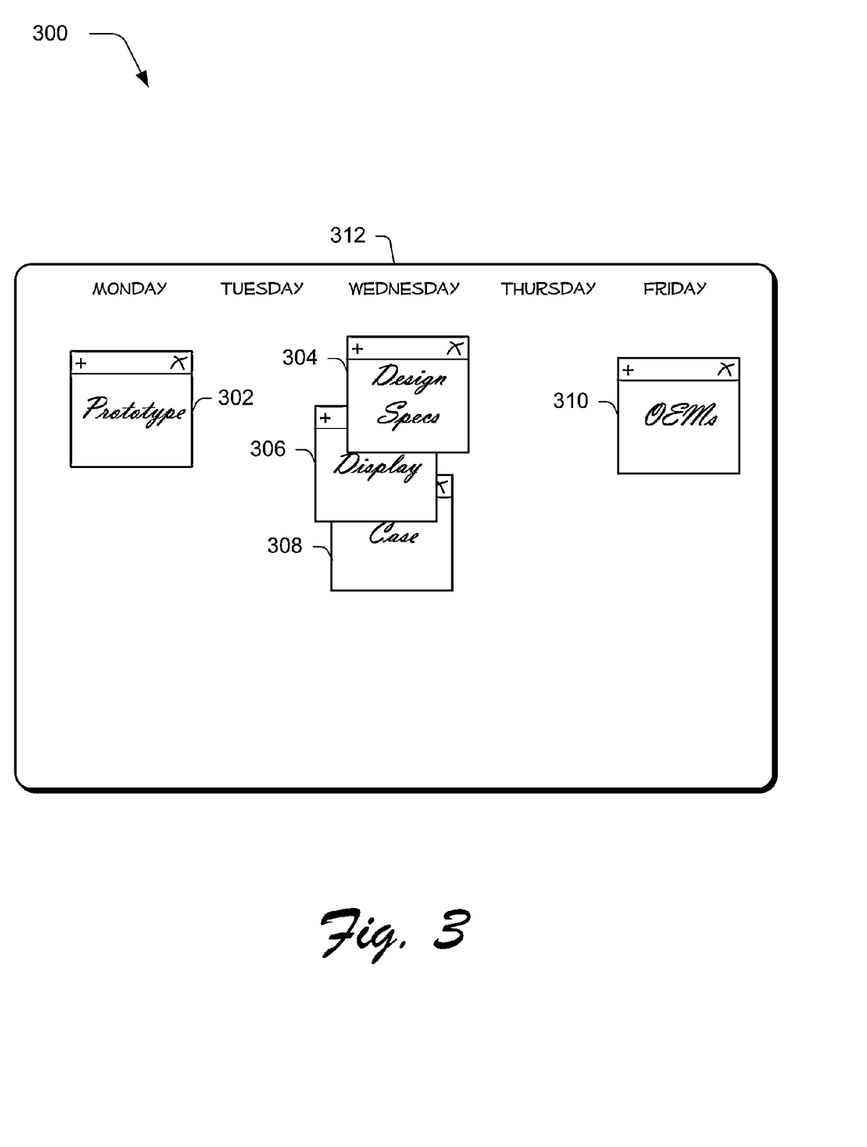
FIG. 3 depicts a system in an example implementation in which a three-dimensional object of FIG. 2 is configured as sticky notes that are arranged on a surface.

FIG. 3 depicts a system 300 in an example implementation in which the three-dimensional object 202 of FIG. 2 is configured as sticky notes 302, 304, 306, 308, 310 that are arranged on a surface 312. The sticky notes 302-310 may be formed to include a variety of features. For example, the sticky notes 302-310 may be formed with one or more sensors that are configured to detect writing on a surface of the note. In another example, the "writing" may be formed by the three-dimensional printer 104 itself, such as to identify a respective item of data that is represented by the note.

The sticky notes 302-310 may also be configured to include functionality that may be used to determine a physical arrangement of the notes in relation to each other. This functionality may include a RFID tag that is readable by a computing device 222, sensors for communication between the objects themselves (e.g., contact sensors, proximity sensors), and so forth. Thus, these sensors may be used to define the physical arrangement of the devices, one to another.

This physical arrangement of the objects may then be used to define a corresponding logical relationship of the items of data that are represented by the objects. In the illustrated example, the sticky notes 302-310 are representative of appointments, which in this case are steps in a product design process. The overall arrangement of the sticky notes 302-310, one to another, may be used to define an order of the appointments. Further, location on the surface 312 may also be used to indicate timing, such as particular days in this example. This physical arrangement of the sticky notes 302-310 may thus be used to define a logical relationship of the items of data represented by the objects, e.g., the appointments. A variety of other examples are also contemplated.

For instance, objects (e.g., sticky notes 304-308) may be stacked to form a group. Thus, the group may be formed logically to include items of data represented by the notes, e.g., that design specs include a display and case. Similar techniques may be used to separate items, such as to separate stacked items into individual groups. In this way, the physical objects may be used to extend a user's experience with a computing device 222. Although sticky notes were described, the three-dimensional object 202 may be representative of a wide variety of different types of data, such as a document, pages of a document, image, song, multimedia, appointments, items in a To-Do list, variables in a formula, contacts, tasks, notes, and so forth.

Example Procedures

The following discussion describes three-dimensional printing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3, respectively.

Figure 4:
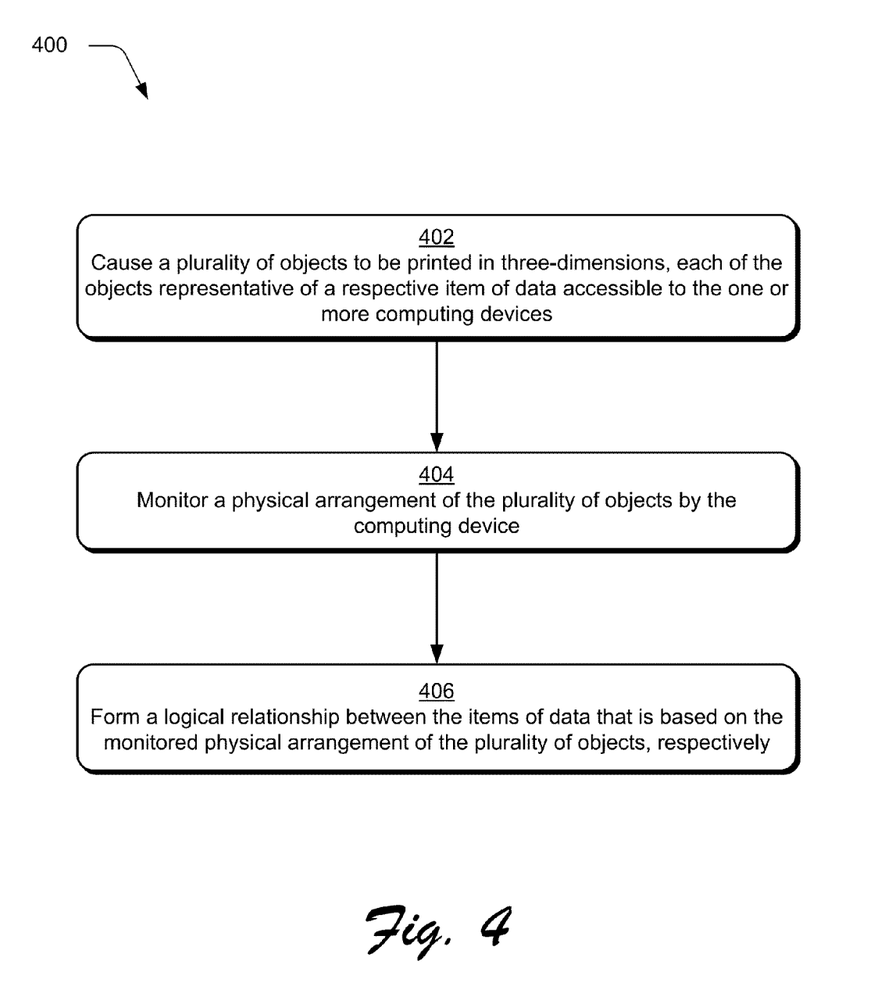
FIG. 4 is a flow diagram depicting a procedure in an example implementation in which a physical relationship of printed objects is used to define a logical relationship to items of data that are represented by the objects.

FIG. 4 depicts a procedure 400 in an example implementation in which a physical relationship of printed objects is used to define a logical relationship to items of data that are represented by the objects. A plurality of objects are caused to be printed in three-dimensions by a computing device, each of the objects representative of a respective item of data accessible to the one or more computing devices (block 402). As previously described, the three-dimensional object 202 may be printed in a variety of ways by the three-dimensional printing mechanism 108 of the three-dimensional printer 104. Further, these items may be representative of a variety of different items of data, such as notes, a document, pages of a document, image, song, multimedia, appointments, items in a To-Do list, variables in a formula, contacts, tasks, notes, and so forth.

A physical arrangement of the plurality of objects is monitored by the computing device (block 404). This arrangement may be monitored by the objects themselves (e.g., proximity or contact sensors), by a computing device 222 that is communicatively coupled to the objects via one or more communication components 220, and so forth.

A logical relationship is formed between the items of data that is based on the monitored physical arrangement of the plurality of objects, respectively, by the computing device (block 406). This may include formation of groups, ordering, temporal relationships that are formed based on tracked movement of the objects (e.g., to compose an animation, mimic a manufacturing process, etc.), separation of items from a group, and so on. Thus, the objects may extend a computing experience through a physical representation of items of data. Other examples are also contemplated, such as to modify the objects and have similar modifications made to the respective items of data.

Figure 5:
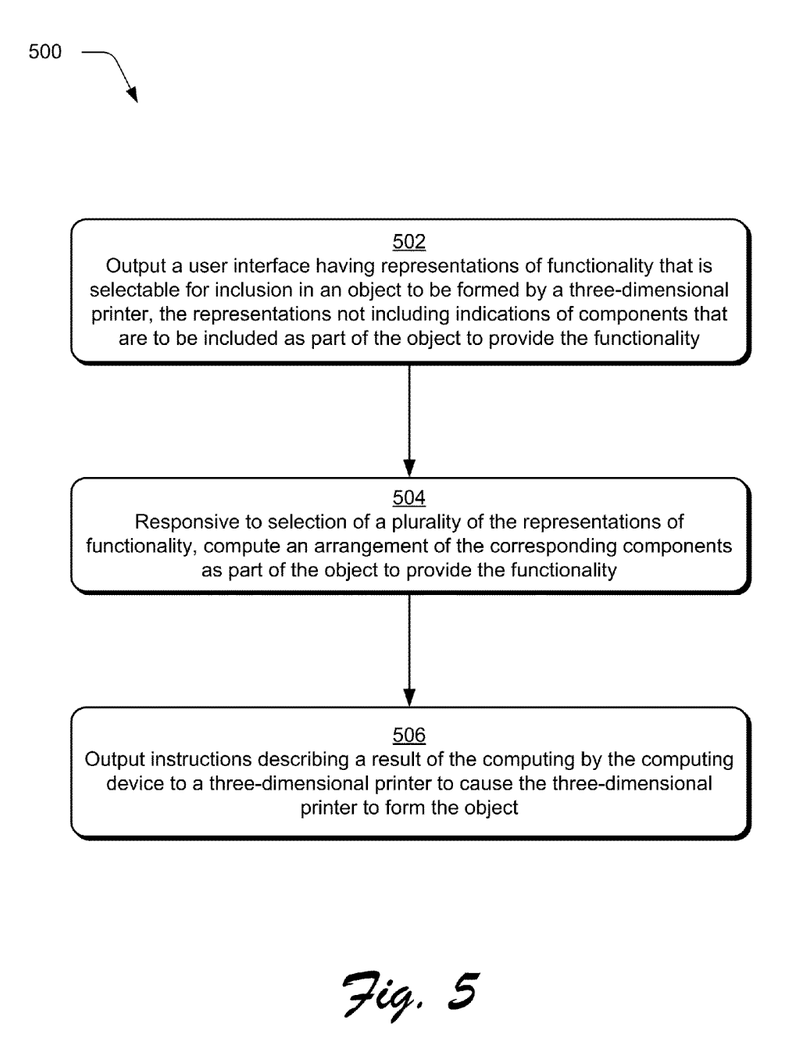
FIG. 5 is a flow diagram depicting a procedure in an example implementation in which a user interface is output to select functionality, the functionality used as a basis to compute an arrangement and select components to be included in a three-dimensional printed object.

FIG. 5 depicts a procedure 500 in an example implementation in which a user interface is output to select functionality, the functionality used as a basis to compute an arrangement and select components to be included in a three-dimensional printed object. A user interface is output having representations of functionality that is selectable for inclusion in an object to be formed by a three-dimensional printer, the representations not including indications of components that are to be included as part of the object to provide the functionality (block 502). The functionality, for example, may refer to operations that are to be performed by the object, such as medical operations (e.g., monitor heartbeat or temperature), provide authentication (e.g., provide a key in response to a query to access a premises, vehicle, or computing device), display techniques (e.g., change color to notify a user of a sensed condition), and so forth.

Responsive to selection of a plurality of the representations of functionality, an arrangement of the corresponding components is computed as part of the object to provide the functionality (block 504). The three-dimensional printing module 106, for instance, may determine which components are to be formed (e.g., printed) by the three-dimensional printing mechanism 108 as well as preconfigured components that are to be included in the object. The mechanism may then compute an arrangement for the components to be included as part of the object.

This may be performed in conjunction with a variety of other inputs. For example, a camera (e.g., depth sensing camera) or other sensors may be used to detect physical characteristics of an intended user of the object. Thus, the object may also be customized for a particular user. A variety of other examples are also contemplated.

Instructions are output describing a result of the computing by the computing device to a three-dimensional printer to cause the three-dimensional printer to form the object (block 506). The printing instruction 204, for instance, may describe how to form a substrate and components (e.g., sensors, antennas, interconnection) of the object, where to place preconfigured components, and so forth. A variety of other examples are also contemplated.

Example System and Device

Figure 6:
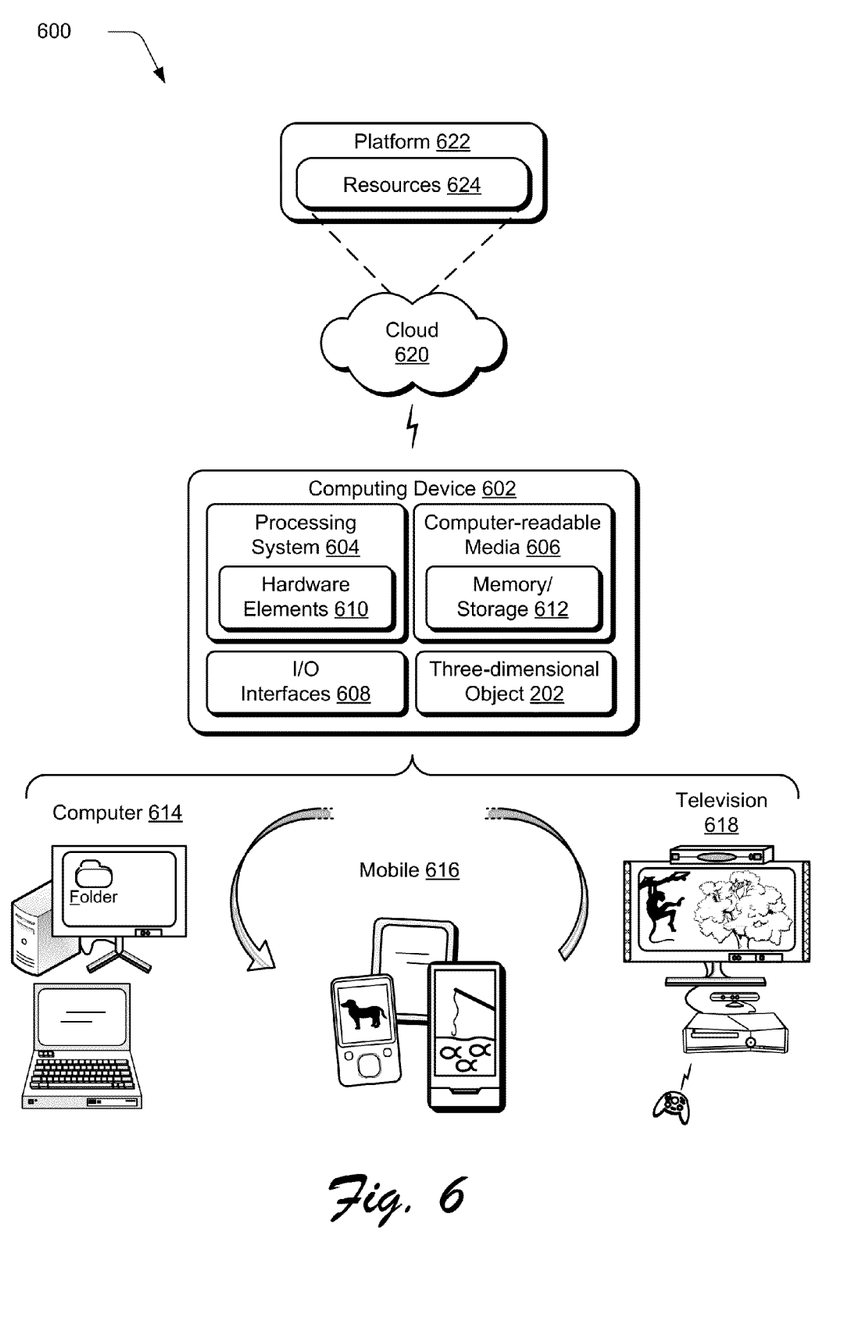
FIG. 6 illustrates an example system including various components of an example device that can be implemented as any type of computing device as described with reference to FIGS. 1 and 2 to implement embodiments of the techniques described herein.

FIG. 6 illustrates an example system generally at 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system. Thus, the computing device 602 may correspond to the computing devices 102, 222 previously described. The three-dimensional object 202 may be formed for communicative coupling to the computing device 602, such as a peripheral device (e.g., stylus), inclusion of one or more sensors, and so forth.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   a three-dimensional printer having a three-dimensional printing mechanism that is configured to form a physical object in three dimensions; and
   a computing device communicatively coupled to the three-dimensional printer, the computing device including a three-dimensional printing module implemented at least partially in hardware to cause the three-dimensional printer to form the physical object in three dimensions as having functionality configured to communicate with a computing device, the three-dimensional printing module configured to cause the object that is formed by the three-dimensional printer to be associated with a respective item of data that is accessible to the computing device such that a physical arrangement of the object with another said object causes the computing device to form a corresponding logical relationship between the items of data that are associated with the respective said objects.

2. A system as described in claim 1, wherein the three-dimensional printing mechanism is configured to place preconfigured components within the object as part of forming the object.

3. A system as described in claim 2, wherein the preconfigured component is a processing system and the three-dimensional printing module is configured to program the processing system to perform one or more operations.

4. A system as described in claim 3, wherein the processing system of the object is configured to communicate a result of performance of the one or more operations to the computing device for further processing by the computing device.

5. A system as described in claim 4, wherein the processing system is programming to process signals received from one or more other preconfigured components of the object that are configured as sensors.

6. A system as described in claim 1, wherein the three-dimensional printer includes a plurality of cartridges, each pertaining to a different type of component.

7. A system as described in claim 6, wherein the types include display components, sensor components, or processing components.

8. A system as described in claim 6, wherein the three-dimensional printing mechanism is configured to communicatively couple a plurality of preconfigured components, one to another, as part of the forming of the object.

9. A system as described in claim 1, wherein the three-dimensional printing module is configured to output a user interface having a plurality of different predefined objects that are formable by the three-dimensional printer.

10. A system as described in claim 1, wherein the three-dimensional printing module is configured to:
    output a user interface having a plurality of different options for predefined functionality that is includable in the object that is formable by the three-dimensional printer;
    determine which components are to be included in the object to provide selected said functionality; and
    compute an arrangement of the components for inclusion as part of the object.

11. A method implemented by one or more computing devices, the method comprising:
    causing a plurality of objects to be printed in three-dimensions, each of the objects representative of a respective item of data accessible to the one or more computing devices;
    monitoring a physical arrangement of the plurality of objects by the computing device; and
    forming a logical relationship between the items of data that is based on the monitored physical arrangement of the plurality of objects, respectively.

12. A method as described in claim 11, wherein the physical arrangement of the plurality of objects involves stacking the objects and the logical relationship is to group the items of data together.

13. A method as described in claim 12, wherein the logical relationship also follows an order of the plurality of objects in the stack.

14. A method as described in claim 11, wherein the physical arrangement of the plurality of objects involves ordering the objects and the logical relationship is to order the items of data accordingly.

15. A method as described in claim 11, wherein the physical arrangement of the plurality of objects involves separating the objects from each other and the logical relationship is to form respective groups for the separated objects.

16. A system comprising:
a three-dimensional printer having a three-dimensional printing mechanism that is configured to form a physical object in three dimensions; and
a computing device communicatively coupled to the three-dimensional printer, the computing device including a three-dimensional printing module implemented at least partially in hardware to cause the three-dimensional printer to output a user interface having a plurality of different options for predefined functionality that is includable in the physical object that is formable by the three-dimensional printer, determine which components are to be included in the object to provide selected said functionality, compute an arrangement of the components for inclusion as part of the physical object, and form the physical object in three dimensions as having functionality configured to communicate with a computing device.

17. A system as described in claim 16, wherein the three-dimensional printer includes a plurality of cartridges, each cartridge pertaining to a different type of component.

18. A system as described in claim 16, wherein the physical arrangement of the plurality of objects involves ordering the objects and the logical relationship is to order the items of data accordingly.

19. A system as described in claim 16, wherein the physical arrangement of the plurality of objects involves separating the objects from each other and the logical relationship is to form respective groups for the separated objects.

* * * * *